United States Patent [19]
Kawatra et al.

[11] Patent Number: 5,335,785
[45] Date of Patent: Aug. 9, 1994

[54] FLOTATION COLUMN WITH ADJUSTABLE SUPPORTED BAFFLES

[75] Inventors: Surendra K. Kawatra; Timothy C. Eisele, both of Houghton, Mich.

[73] Assignee: Board of Control of Michigan Technological University, Houghton, Mich.

[21] Appl. No.: 64,825

[22] Filed: May 19, 1993

[51] Int. Cl.$^5$ .............................. B03D 1/24; B03D 1/14
[52] U.S. Cl. ..................................... 209/170; 209/168; 210/221.2; 261/122.1; 261/123; 261/124
[58] Field of Search .......................... 209/168, 170; 261/122.1, 123, 124; 210/221.2

[56] References Cited

U.S. PATENT DOCUMENTS

| 3,339,730 | 9/1967 | Boutin . | |
| 4,028,229 | 6/1977 | Dell | 209/164 |
| 4,066,540 | 1/1978 | Wada et al. | 210/44 |
| 4,165,279 | 8/1979 | Dell . | |
| 4,431,531 | 2/1984 | Hollingsworth | 209/170 |
| 4,450,072 | 5/1984 | Suplicki | 209/170 |
| 4,592,834 | 6/1986 | Yang | 209/166 |
| 4,617,113 | 10/1986 | Christoperson . | |
| 4,851,036 | 7/1989 | Anthes et al. . | |
| 4,981,582 | 1/1991 | Yoon . | |
| 5,116,487 | 5/1992 | Parekh . | |
| 5,167,798 | 12/1992 | Yoon . | |

FOREIGN PATENT DOCUMENTS 60-35094 2/1985 Japan .

Primary Examiner—Thomas M. Lithgow
Attorney, Agent, or Firm—Michael, Best & Friedrich

[57] ABSTRACT

An apparatus for separating by froth flotation hydrophobic and hydrophilic particles contained in an aqueous slurry, the apparatus comprising a generally vertical tubular column having an upper froth zone, an upper separation zone, a lower separation zone, an air inlet zone, and an intermediate feed inlet zone; a feed inlet, air inlet, froth outlet and a tailings outlet; an upper baffle unit comprising a plurality of horizontally extending upper baffle plates, a vertical upper support member including an upper end portion, and first upper apparatus for removably mounting the upper baffle plates on the upper support member at predetermined vertically spaced positions; each of the upper baffle plates comprising a mounting aperture and a plurality of flow apertures; and a second upper apparatus for removably supporting the upper support member in the column with the upper baffle plates in the upper separation zone. The apparatus can include a lower baffle unit. The open area of each baffle plate and the vertical space between adjacent baffle plates can vary between different baffle plates in dependence upon the position of a baffle plate in the column, or in dependence upon one or more of the following: a solids flow rate at the position, a liquid flow rate at the position, and a gas flow rate at the position. The invention also provides a method for improving the operating performance of an unbaffled column.

18 Claims, 1 Drawing Sheet

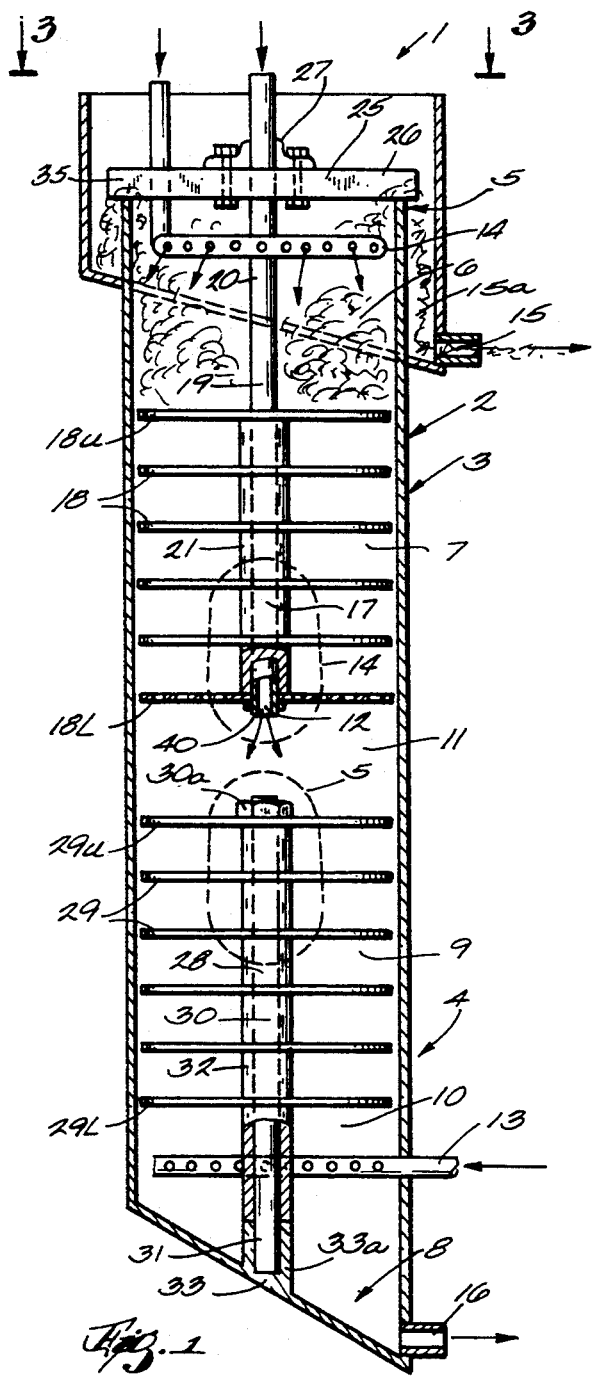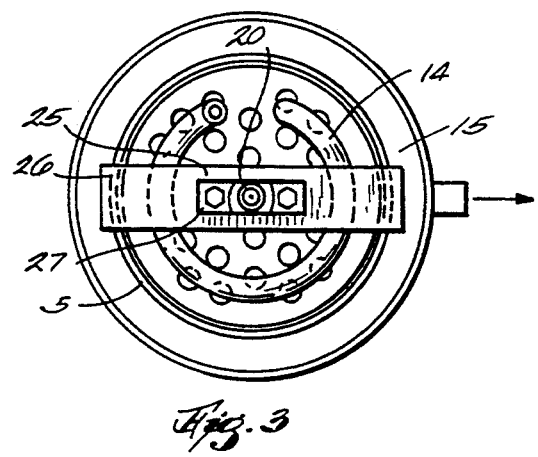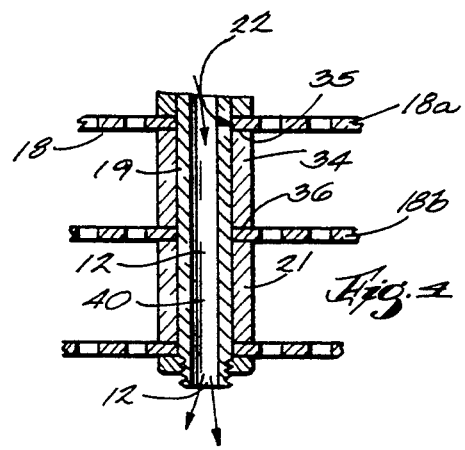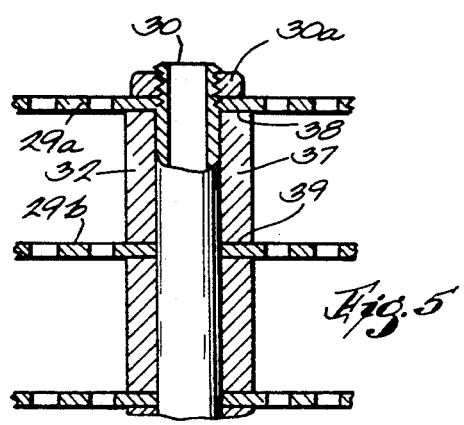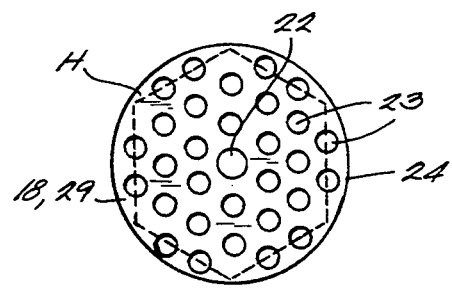

FLOTATION COLUMN WITH ADJUSTABLE SUPPORTED BAFFLES

BACKGROUND OF THE INVENTION

1. Field Of The Invention

The invention relates to flotation columns, and particularly to flotation columns for use in the concentration of mineral ores by froth flotation.

2. Reference To Prior Art

Froth flotation involves conditioning an aqueous slurry of a mixture of mineral and gangue particles with one or more flotation agents to promote flotation of either the mineral or the gangue constituents of the slurry when the slurry is aerated. The slurry is aerated by injecting air bubbles which tend to become attached to hydrophobic particles in the slurry, thereby causing these particles to rise to the surface of the body of slurry and form a froth fraction which overflows or is withdrawn from the flotation column. Hydrophilic particles remain in the aqueous phase and are removed therewith.

Column flotation is becoming widely used in a variety of mineral and coal cleaning operations, to separate various mineral species from impurities based on their different surface properties. Coal in particular can be readily separated from impurities by froth flotation, due to its naturally hydrophobic nature. Flotation columns are particularly effective for separating coal particles finer than approximately 0.5 millimeters, and considerably finer particles of other minerals.

Flotation columns for accomplishing froth flotation typically consist of a relatively tall, vertical column. Air is injected at the bottom, a slurry is introduced at approximately the midpoint and fresh wash water is typically injected at the top. As air bubbles rise through the column, hydrophobic particles attach and are carried up to the surface of the slurry and into the froth, while hydrophilic gangue particles settle to the base of the column and are removed in the tailings product. The solids-laden air bubbles forming the layer of froth are flushed with wash water to remove misplaced gangue particles, and the gangue particles return to the aqueous phase. A mixture of mineral particles and froth is removed as clean product from the top of the column.

Among major factors which reduce the efficiency of flotation columns are (a) vertical mixing of the slurry and (b) inadequate separation of gangue particles resulting in misplacement into the froth. In separating coal for example, vertical mixing causes gangue to be carried up into the froth layer, and coal particles to be carried down into the aqueous phase at the base of the column. Misplacement of gangue particles into the froth can occur by weak attachment to bubbles or mechanical entrapment by coal particles attached to the air bubbles. Reducing these vertical mixing and misplacement effects improves the separation selectivity between coal and gangue particles, so that both the froth product and the tailings product are more nearly pure, and both the quality and the recovered quantity of the coal are increased.

Flotation columns are typically 30–50 feet tall. Columns of such height minimize the undesirable effects of vertical mixing, but such height makes the columns difficult to install and operate. For example, rising air bubbles carry a significant amount of water upward, producing a vertical pumping action. Also, coarse air bubbles greater than 1 centimeter in diameter occasionally pass through the column and produce a churning action which disrupts the froth layer. Such vertical pumping and churning actions make the performance of relatively tall columns somewhat erratic.

It is known to employ internal baffles to reduce vertical mixing and increase particle-bubble contact. U.S. Pat. Nos. 4,028,229, 4,066,540, 4,450,072 and 4,851,036 disclose columns having internal baffles. However, there previously has been no convenient means to adjust the open area or vertical spacing of baffling in columns to accomodate different slurry compositions, different minerals or coals, or different slurry flow rates. Nor has there been a convenient means to retrofit baffling into existing unbaffled columns.

SUMMARY OF THE INVENTION

An objective of the invention is improving the operating performance of an existing unbaffled flotation column by retrofitting the column with baffles.

Another objective is providing the capability of changing the vertical spacing and open area of the baffles in a flotation column by simple procedures.

A further objective is enabling retrofitting of baffling into a flotation column without replacement of the entire column.

The invention provides apparatus for separating by froth flotation hydrophobic and hydrophilic particles contained in an aqueous slurry. The apparatus includes a generally vertical tubular column having an upper portion and a lower portion. The upper portion includes an upper end, an upper froth zone and an upper separation zone, and the lower portion includes a bottom, a lower separation zone and an air inlet zone. The column includes an intermediate feed inlet zone interposed between the upper and lower portions. A feed inlet introduces aqueous slurry into the feed inlet zone; an air inlet introduces gas into the air inlet zone; a froth outlet discharges a froth fraction containing hydrophobic particles from the froth zone; and a tailings outlet discharges a tailing fraction containing hydrophilic particles from the lower portion of the column.

An upper baffle unit includes a plurality of horizontally extending upper baffle plates, a vertical upper support member including an upper end portion, and first upper means for removably mounting the upper baffle plates on the upper support member at predetermined vertically spaced positions. Each of the upper baffle plates includes a mounting aperture and a plurality of flow apertures, and each baffle plate has a periphery substantially conforming to the upper interior cross section of the column. The feed inlet preferably comprises an interior passage and opening defined in the upper support member. Second upper means removably supports the upper support member in the column with the upper baffle plates in the upper separation zone. A lower baffle unit includes a plurality of lower baffle plates, a vertical lower support member including a lower end portion, and first lower means for removably mounting the lower baffle plates on the lower support member at predetermined vertically spaced positions. Second lower means removably supports the lower support member with the lower baffle plates in the lower separation zone.

Each baffle plate includes a horizontal cross sectional area; each flow aperture includes an open cross sectional area; and the total open cross sectional area of all flow apertures on a baffle plate defines an open area of that baffle plate. The open area is in the range of 10 to 50 percent, preferably 15 to 40 percent, of the horizontal cross sectional area. The open area can vary between different baffle plates, in dependence upon the position of a baffle plate in the column, or in dependence upon one or more of the following: a solids flow rate at the position, a liquid flow rate at the position, and a gas flow rate at the position. The vertical space between adjacent baffle plates can vary between different pairs of adjacent baffle plates, in dependence upon the positions of the baffle plates in the column, or in dependence upon one or more of the following: solids flow rates at the positions, liquid flow rates at the positions, and gas flow rate at the positions. Each flow aperture has a diameter about ten times the diameter of the largest particles to be entering the apparatus, and the flow apertures are located in a hexagonal pattern along the periphery of each baffle.

The invention also provides a method for improving the operating performance of an apparatus for separating by froth flotation hydrophobic and hydrophilic particles contained in an aqueous slurry, comprising the steps of providing a generally vertical, unbaffled tubular column; providing an upper baffle unit; providing second upper means for removably supporting the upper baffle unit in the column; and preferably providing a lower baffle unit and second lower means for removably supporting the lower baffle unit in the column.

Other aspects and advantages will be apparent to those skilled in the art upon review of the following detailed description, drawings and claims.

BRIEF DESCRIPTION OF THE DRAWINGS

FIG. 1 is a partially broken away side view of a flotation column incorporating adjustable baffle units therein.

FIG. 2 is a top view of a baffle plate having apertures therein.

FIG. 3 is a top view of a flotation column taken along line 3—3 in FIG. 1.

FIG. 4 is an enlarged cross-sectional side view of upper baffle plates mounted on the upper support member, as indicated by circle 4 in FIG. 1.

FIG. 5 is an enlarged cross-sectional side view of lower baffle plates mounted on the lower support member, as indicated by circle 5 in FIG. 1.

DESCRIPTION OF A PREFERRED EMBODIMENT

While an apparatus of the invention can be used for separating a wide variety of finely divided minerals, it is particularly adaptable for cleaning coal, and will be described in connection with that application.

Referring to FIG. 1, apparatus 1 for separating by froth flotation hydrophobic and hydrophilic particles contained in an aqueous slurry comprises a generally vertical tubular column 2. The column 2 includes an upper portion 3 and a lower portion 4. The upper portion 3 includes an upper interior cross section, and the lower portion 4 has a lower interior cross section. Upper portion 3 includes an open upper end 5, an upper froth zone 6 and an upper separation zone 7. Lower portion 4 includes angled bottom 8, lower separation zone 9 and air inlet zone 10. Column 2 includes an intermediate feed inlet zone 11 interposed between the upper portion 3 and lower portion 4. A feed inlet 12 introduces the aqueous slurry into the feed inlet zone 11. An air inlet 13 introduces gas into air inlet zone 10 for formation of gas bubbles and upward flow through the column 2. A wash water inlet 14 introduces fresh wash water into the upper froth zone 6 for travel downward through column 2. Froth overflows upper end 5 from froth zone 6, and into froth outlet annular member 15a. Froth outlet annular member 15a has an open top and is concentric with column 2, and includes an angled bottom for directing the overflowed froth fraction toward froth outlet 15. The froth fraction containing hydrophobic particles is discharged through froth outlet 15. Tailings outlet 16 discharges a tailing fraction containing hydrophilic gangue particles from lower portion 4.

An upper baffle unit 17 comprises a plurality of horizontally extending upper baffle plates 18, a vertical upper support member 19 including an upper end portion 20, and first upper means 21 for removably mounting the upper baffle plates 18 on the upper support member 19 at predetermined vertically spaced positions. As shown in FIG. 2, each of the upper baffle plates 18 comprises a mounting aperture 22 and a plurality of flow apertures 23, and each of the upper baffle plates 18 has a periphery 24 substantially conforming to the upper interior cross section of the upper portion 3 of column 2. Periphery 24 may deviate from the upper interior cross section, resulting in openings between each upper baffle plate 18 and the upper interior cross section. Such openings may be left open or filled by a liner (not shown). Returning to FIG. 1, second upper means 25 removably supports the upper support member 19 in column 2, so that upper baffle plates 18 are located in the upper separation zone 7. Second upper means 25 comprises a member 26 and fastener 27, such as a mounting flange or welded connection. Member 26 extends across upper end 5 and includes an aperture through which the upper end portion 20 of upper support member 19 extends. The fastener 27 is joined to member 26 and fastened to the upper end portion 20 of upper support member 19. Uppermost baffle plate 18U is located below the upper froth zone 6, and a lowermost baffle plate 18L is above the feed inlet zone 11. Locating uppermost baffle plate 18U below the upper froth zone 6 prevents stiffened froth from accumulating in the baffles and plugging the column.

As illustrated in FIG. 1, the lower baffle unit 28 comprises a plurality of horizontally extending lower baffle plates 29, a vertical lower support member 30 including a lower end portion 31, and first lower means 32 for removably mounting the lower baffle plates 29 on lower support member 30 at predetermined vertically spaced positions. As shown in FIG. 2, each of the lower baffle plates 29 comprises mounting aperture 22 and a plurality of flow apertures 23, and each of the lower baffle plates 28 has a periphery 24 substantially conforming to the lower interior cross section. Periphery 24 may deviate from the lower interior cross section, resulting in openings between each lower baffle plate 29 and the lower interior cross section. Such openings may be left open or filled by a liner (not shown). Second lower means 33 removably supports the lower support member 30 in column 2 with lower baffle plates 29 in lower separation zone 9. Second lower means 33 includes bottom 9, and may include a fitting 33a. An uppermost baffle plate 29U is below the feed inlet zone 11, and a lowermost baffle plate 29L is above air inlet zone 10. Locating the lowermost baffle plate 29L above air inlet zone 10 ensures that the injected air can form uniformly distributed bubbles.

As shown in FIG. 4, first upper means 21 for removably mounting the upper baffle plates 18 on upper support member 19 comprises spacer means 34. Spacer means 34 has an upper end 35 and a lower end 36. Upper end 35 contacts a first baffle plate 18a and lower end 36 contacts a second baffle plate 18b, to space the first baffle plate 18a at a predetermined vertical spacing above the second baffle plate 18b. The spacer means 34 preferably comprises sliding means adapted for sliding over upper support member 19, such as an annular spacer having an outside diameter greater than the diameter of the mounting aperture 22 and a length providing a desired vertical space between adjacent baffle plates 18a, 18b. Such spacer means 34 permits the vertical space to vary between different pairs of adjacent baffle plates 18a, 18b. First upper means 21 can also comprise collar means (not shown). The vertical space between adjacent baffle plates 18 can vary between different pairs of adjacent baffle plates 18. The vertical space varies in dependence upon the vertical positions of adjacent baffle plates 18 in column 2, or in dependence upon one or more of the following: a solids flow rate at positions, a liquid flow rate at positions, and a gas flow rate at positions. The mounting distance preferably is close enough to break up bubbles to sizes less than approximately 1 cm.

As shown in FIG. 5, first lower means 32 comprises spacer means 37 having upper end 38 and lower end 39, and function in a manner similar to first upper means 21 and spacer means 34 to space adjacent lower baffle plates 29a and 29b at predetermined vertical spacings. First lower means 32 can also comprise collar means (not shown). The vertical space between adjacent lower baffle plates 29 can vary between different pairs of adjacent lower baffle plates 29, as described above for upper baffle plates 18.

As shown in FIGS. 1 and 4, feed inlet 12 preferably comprises an interior passage 40 defined in upper support member 19. Feed inlet 12 may also be separate from upper support member 19, and upper support member 19 can be a rod (not shown). As shown in FIGS. 1 and 5, lower support member 30 is a rod. The rod may include a suitable fastener 30a on the upper end thereof.

As shown in FIG. 2, each upper and lower baffle plate 18,29 has a horizontal cross sectional area. Each flow aperture 23 includes an open cross sectional area. The total open cross sectional area of all flow apertures 23 on each baffle plate 18,29 defines an open area A (not shown) of each baffle plate 18,29. Open area A is in the range of 10 to 50 percent, preferably 15 to 40 percent, of the horizontal cross sectional area of each baffle plate. Open area A can vary between different baffle plates 18,29 in dependence upon the vertical position of each baffle plate 18,29 in column 2, or in dependence upon one or more of the following: a solids flow rate at the vertical position, a liquid flow rate at the position, and a gas flow rate at the position. Open area A of baffle plates 18 above feed inlet 12 preferably is greater than open area A of baffle plates 29 below feed inlet 12 when the froth fraction exceeds the tailing fraction. More preferably, open area A progressively decreases as the position in column 2 approaches bottom 8. Each flow aperture 23 has a diameter about ten times the diameter of the largest particles to be entering apparatus 1, to prevent clogging while also avoiding passing coarse air bubbles. As also shown in FIG. 2, the flow apertures 23 are located in concentric hexagonal patterns H in relation to periphery 24, to minimize the distance from any point on the baffle to an aperature and thereby reduce the possibility of particle deposits and provide for uniform distribution of slurry and air bubbles in the spaces between baffles.

In a second embodiment (not shown), the upper support member 19 and lower support member 30 comprise a single support member. The single support member removably supports both the plurality of upper baffle plates 18 in upper separation zone 7 and the plurality of lower baffle plates 29 in lower separation zone 9. In this embodiment, all baffle plates are removable by removing the single support member.

In operation, aqueous slurry containing water, hydrophobic coal particles, hydrophilic gangue particles and one or more conditioning agents is introduced through feed inlet 12. Air is introduced through air inlet 13, and wash water is introduced through wash water inlet 14. After introduction of air to the slurry, bubbles form and travel upward through the column and form the froth. As bubbles travel upward through the slurry, hydrophobic particles attach thereto and are carried into the froth. Although the bulk of hydrophilic particles remain in the slurry, as bubbles and attached hydrophobic particles travel upward, a fraction of misplaced hydrophilic particles are also carried into the froth. The froth is washed with wash water to remove misplaced hydrophilic particles for return to the slurry. Hydrophilic particles settle to the bottom 8 for removal in the tailings product through tailings outlet 16. The froth fraction having hydrophobic mineral particles therein overflows upper end 5 and is removed through the froth outlet 15.

The upper and lower baffle plates 18,29 impede the flow of liquids, gases and solids in both directions in the column, preventing vertical mixing and causing more efficient separation than in an unbaffled column. The open area A and vertical space between adjacent upper baffle plates 18 or lower baffle plates 29 can vary according to the position of each baffle plate 18,29 in the column or the flow rates at each position in the column. Such variation permits more efficient separation than in a column having constant open areas and spacings. Baffle plates 18,29 having different open areas A and vertical spacings can be easily changed to accomodate different slurry compositions and flow rates.

The following examples are for illustrative purposes only and are not to be construed as limiting the scope of the specification or claims contained herein.

EXAMPLES

EXAMPLE 1

Baffles were used to retrofit a 3" diameter by 6' tall flotation column, to improve its performance in removing ash minerals and pyritic sulfur from coal. The slurry processed was composed of Pittsburgh seam bituminous coal, water and a polypropylene-glycol methyl ether conditioning agent. The coal contained 38.0% ash-forming minerals and 3.23% total sulfur. The final feed slurry contained 400 grams of coal per 1600 milliliters of slurry, and therefore contained 23% solids by weight. 80% of the particles were less than 40 micrometers in diameter. The conditioned slurry was fed at a rate of 1.6 liters per minute for 1 minute, and processed for 10 minutes. Air was fed at a rate of 1 liter per minute. Column performance with baffles having 14%, 19%, 29% and 38% open areas was compared with the performance of the column without baffles. The results are displayed in Table 1.

TABLE 1

Effects of Baffling on Flotation Column Performance

| % Baffle Open area | Time to Recover 50% of Combustible Matter | Froth Ash Content, Weight % | Froth Sulfur Content, Weight % | Final % Recovery of Combustible Matter |
|---|---|---|---|---|
| 100% | 3.5 ± 0.5 | 8.5 ± 1.3 | 2.24 ± 0.02 | 86.9 ± 1.2 |
| 38% | 4.2 ± 0.2 | 4.8 ± 0.1 | 1.83 ± 0.02 | 90.5 ± 0.4 |
| 29% | 5.9 ± 0.1 | 4.0 ± 0.1 | 1.85 ± 0.01 | 84.3 ± 0.2 |
| 19% | 7.1 ± 0.5 | 4.0 ± 0.2 | 1.75 ± 0.03 | 82.0 ± 3.3 |
| 14% | 11.2 ± 1.6 | 3.3 ± 0.1 | 1.72 ± 0.05 | 45.4 ± 10.9 |

*Combustible matter is clean, ash-free coal.

The results show that for this column processing the described slurry at a rate of 1.6 liters per minute, baffle open area between 29 and 38 percent is optimum. Larger baffle open areas produced a higher ash froth, and lower baffle open areas reduced the final recovery of combustible matter. The determination of optimum baffle open area for the column processing the described slurry at the described rate was only made practical by the ease with which the baffles were installed and changed.

EXAMPLE 2

An 8" diameter by 30' tall pilot-scale flotation column was operated in a coal-cleaning plant which processed a mixture of bituminous coals from three different seams. The coal slurry contained 39.8% ash and 2.83% sulfur, and a total of 10% solids by weight. 80% of the slurry particles were finer than 176 micrometers. Polypropylene glycol methyl ether, #2 fuel oil and a commercially available conditioning agent were added to the slurry. Slurry was fed at a rate of 7.6 liters per minute for 25 minutes. Air was fed at a rate of 28 liters per minute. An unmodified column was only able to recover 15% of the combustible matter from the coal. After installing baffles with 33% open area, the column recovered 50% of the combustible matter, while maintaining a froth grade of 6.5% ash and 2.5% sulfur. The baffles were installed in a period of less than 30 minutes.

We claim:

1. An apparatus for separating by froth flotation hydrophobic and hydrophilic particles contained in an aqueous slurry, said apparatus comprising a generally vertical tubular column having an upper interior cross section, a lower interior cross section, an upper portion and a lower portion, said upper portion including an upper end, an upper froth zone and an upper separation zone, said lower portion including a bottom, a lower separation zone and an air inlet zone, and said column having an intermediate feed inlet zone interposed between said upper and lower portions;

a feed inlet in said feed inlet zone for introducing said aqueous slurry into said feed inlet zone for separation in said column;

an air inlet in said air inlet zone for introducing gas into said air inlet zone for formation of gas bubbles and upward flow through said column;

a froth outlet for discharging a froth fraction containing hydrophobic particles from said froth zone;

a tailings outlet in said lower portion for discharging a tailing fraction containing hydrophilic particles from said lower portion;

an upper baffle unit, said unit comprising a plurality of horizontally extending upper baffle plates, a vertical upper support member including an upper end portion, and first upper means for removably mounting said upper baffle plates on said upper support member at predetermined vertically spaced positions;

each of said upper baffle plates comprising a mounting aperture through which said vertical upper support member extends and a plurality of flow apertures, and each of said upper baffle plates having a periphery substantially conforming to said upper interior cross section of said column; and second upper means for removably supporting said upper support member in said column with said upper baffle plates in said upper separation zone, with an uppermost baffle plate below said froth zone and a lowermost baffle plate above said feed inlet zone.

2. An apparatus according to claim 1 comprising a lower baffle unit, said unit comprising a plurality of horizontally extending lower baffle plates, a vertical lower support member including a lower end portion, and first lower means for removably mounting said lower baffle plates on said lower support member at predetermined vertically spaced positions;

each of said lower baffle plates comprising a mounting aperture and a plurality of flow apertures, and each of said lower baffle plates having a periphery substantially conforming to said lower interior cross section of said column; and second lower means for removably supporting said lower support member in said column with said lower baffle plates in said lower separation zone, with an uppermost baffle plate below said feed inlet zone and a lowermost baffle plate above said air inlet zone.

3. An apparatus according to claim 1 wherein said flow apertures are located in concentric hexagonal patterns in relation to said periphery.

4. An apparatus according to claim 1 wherein said first upper means for removably mounting said upper baffle plates on said upper support member comprises spacer means, said spacer means includes an upper end and a lower end, said upper end contacts a first baffle plate and said lower end contacts a second baffle plate, to space said first baffle plate at a vertically predetermined position above said second baffle plate.

5. An apparatus according to claim 1 wherein said first upper means for removably mounting said upper baffle plates on said upper support member comprises collar means.

6. An apparatus according to claim 2 wherein said first lower means for removably mounting said lower baffle plates on said lower support member comprises spacer means, said spacer means having an upper end and a lower end, said upper end contacting a first baffle plate and said lower end contacting a second baffle plate, to space said first baffle plate at a vertically predetermined position above said second baffle plate.

7. An apparatus according to claim 2 wherein said first lower means for removably mounting said lower baffle plates on said lower support member comprises collar means.

8. An apparatus according to claim 1 wherein said second upper means for removably supporting said upper support member in said column comprises a member extending across said upper end and a fastener, and a beam, said beam supporting and holding said upper end portion of said upper support member.

9. An apparatus according to claim 2 wherein said second lower means for removably supporting said lower support member in said column comprises said bottom, and wherein said lower end portion of said lower support member rests on said bottom.

10. An apparatus according to claim 1 wherein said feed inlet comprises an interior passage defined in said upper support member.

11. An apparatus according to claim 1 wherein each said baffle plate includes a horizontal cross sectional area, wherein each said flow aperture includes an open cross sectional area, and the total open cross sectional area of all said flow apertures on each said baffle plate defines an open area of each said baffle plate, wherein said open area is in the range of 10 to 50 percent of the horizontal cross sectional area.

12. An apparatus according to claim 11 wherein said open area varies between different baffle plates.

13. An apparatus according to claim 12 wherein said open area varies in dependence upon said position of said baffle plate in said column.

14. An apparatus according to claim 11 wherein said open area is in the range of 15 to 40 percent of said horizontal cross sectional area.

15. An apparatus according to claim 12 comprising a lower baffle unit, said unit comprising a plurality of horizontally extending lower baffle plates and each of said lower baffle plates has a plurality of flow apertures with the total open cross sectional area of all the apertures on each baffle plate in the lower baffle unit defines an open area of each said baffle plate, said lower baffle unit being located below the feed inlet zone and above the air inlet zone, wherein said open area of baffle plates above said feed inlet is greater than said open area of baffle plates below said feed inlet.

16. An apparatus according to claim 12 wherein said open area progressively decreases as said position in said column approaches said bottom.

17. An apparatus according to claim 1 wherein said vertical space between adjacent baffle plates varies between different pairs of said adjacent baffle plates.

18. An apparatus according to claim 17 wherein said vertical space varies in dependence upon said positions of said adjacent baffle plates in said column.

* * * * *